United States Patent [19]

Aoyama et al.

[11] Patent Number: 4,937,831
[45] Date of Patent: Jun. 26, 1990

[54] DATA PROCESSING APPARATUS FOR A CAMERA

[75] Inventors: Keisuke Aoyama; Akira Akashi, both of Yokohama, Japan

[73] Assignee: Canon Kabushiki Kaisha, Tokyo, Japan

[21] Appl. No.: 427,951

[22] Filed: Oct. 25, 1989

Related U.S. Application Data

[63] Continuation of Ser. No. 331,076, Mar. 28, 1989, abandoned, which is a continuation of Ser. No. 19,685, Feb. 27, 1987, abandoned.

[30] Foreign Application Priority Data

Mar. 5, 1986 [JP] Japan .................................. 61-47882
Mar. 5, 1986 [JP] Japan .................................. 61-47883
Jul. 9, 1986 [JP] Japan ................................. 61-161675

[51] Int. Cl.$^5$ ............................................. G06F 11/10
[52] U.S. Cl. .................................... 371/40.1; 371/21.2; 371/15.1
[58] Field of Search ............... 354/412, 105, 109, 462, 354/421, 435; 371/15.1, 16.4, 21.1, 21.2, 40.1, 40.2, 40.3, 40.4

[56] References Cited

U.S. PATENT DOCUMENTS

| 4,373,810 | 2/1983 | Shreue | 354/412 |
| 4,422,745 | 12/1983 | Hopson | 354/173.11 |
| 4,455,068 | 6/1984 | Izuhara | 354/412 |
| 4,671,640 | 6/1987 | Akada | 354/412 |
| 4,673,275 | 6/1987 | Nakai | 354/412 |
| 4,682,871 | 7/1987 | Metabi | 354/410 |
| 4,707,105 | 11/1987 | Nishioka | 354/412 |
| 4,710,934 | 12/1987 | Traynor | 371/38 |
| 4,712,216 | 12/1987 | Glaise | 371/38 |
| 4,724,455 | 2/1988 | Suzuki | 354/412 |
| 4,726,021 | 2/1988 | Horiguchi | 371/38 |

Primary Examiner—Michael R. Fleming
Attorney, Agent, or Firm—Fitzpatrick, Cella, Harper & Scinto

[57] ABSTRACT

The present invention relates to a data processing apparatus for a camera in which correction data for shading correction or the like is stored in a memory and an output formed by a photo-taking information forming circuit such as a sensor and the correction data are operated to thereby accomplish the photo-taking processing on the basis of the operational output. When the data stored in the memory is read out and the operation processing is effected, if an error is contained in the read-out data, the data is subjected to revision processing to thereby correct the error, and then the operation processing is accomplished.

5 Claims, 11 Drawing Sheets

DATA PROCESSING APPARATUS FOR A CAMERA

This application is a continuation of application Ser. No. 331,076 filed Mar. 28, 1989, which is a continuation of Ser. No. 019,685 filed Feb. 27, 1987, both of which are now abandoned.

BACKGROUND OF THE INVENTION

1. Field of the Invention

This invention relates to a data processing apparatus for a camera provided with a microcomputer comprising a central processing unit (CPU) and a memory device.

2. Description of the Prior Art

The use of a microcomputer in a control circuit for controlling the shutter circuit, the aperture circuit, the photometering circuit, the automatic focus detecting circuit, the sensor circuit, the display circuit, etc. of a camera is known. The microcomputer comprises a central processing unit and a memory device in which are stored a program for the control and data necessary for the execution thereof. The microcomputer and the various surrounding circuits are connected by a data bus, and exchange of data is effected therebetween by control signals. The central processing unit effects predetermined data processing on the data stored in the memory device and the measurement data from the surrounding circuits, in accordance with the predetermined program stored in the memory device, and delivers control signals and data corresponding to the result thereof to the surrounding circuits, to thereby control these surrounding circuits.

A random access memory (RAM), a fixed value memory (ROM) and an electrically erasable programmable fixed value memory (EEPROM) are known as memory devices comprising semiconductors, and they have their own merits and disadvantages. A RAM is capable of rewriting data at any time, but it always requires a back-up power source for the retension of data and loses its memory contents when the power source is cut off and thus, it is not suitable for the control of a camera. A ROM does not require a back-up power source and is excellent for data preservation, but it is not capable of rewriting data, and data are usually written en bloc into it during the manufacture thereof as a mask ROM and therefore, discrete data matching the characteristics of individual cameras cannot be written into a ROM. An EEPROM has the merits of RAM and ROM and does not require a back-up power source for the retension of data and is capable of electrically re-writing data, but it is inferior in data preservation to ROM. Accordingly, EEPROM is poor in reliability for its use as a control device which is incorporated into the camera and thereafter must retain data for a long time, and it is not free from the possibility of losing data.

SUMMARY OF THE INVENTION

One aspect of the present invention is to enhance the reliability of data stored in a memory in a data processing apparatus for a camera.

One aspect of the invention is to provide a data processing apparatus for a camera which causes the data stored in the memory device of a camera controlling computer to include an error correcting code and in which, when an error occurs to the data read out during the reproduction of the data, the error is corrected by the correcting code to the thereby enable correct data to be represented.

Another aspect of the invention is to provide a data processing apparatus for a camera which causes the data stored in the memory device of a camera controlling computer to include an error correcting code and in which when an error occurs to the data read out during the reproduction of the data, new data is formed by an operation on the basis of other data and instead of the data containing the error, the operational data is used to enable substantially correct data to be represented even when an error is contained in the data.

Another aspect of the invention is to provide a data processing apparatus for a camera in which during data processing, correction by the correcting code is effected on error data correctable by the correcting code and said operation processing is effected on error data uncorrectable by the correcting code to thereby form new data.

One aspect of the application is to provide a data processing apparatus for a camera in which the data of the data processing apparatus is shading correcting data and the memory device is EEPROM.

Other objects of the present invention will become apparent from the following description of embodiments thereof taken in conjunction with the accompanying drawings.

DESCRIPTION OF THE PREFERRED EMBODIMENTS

Figure 1A:
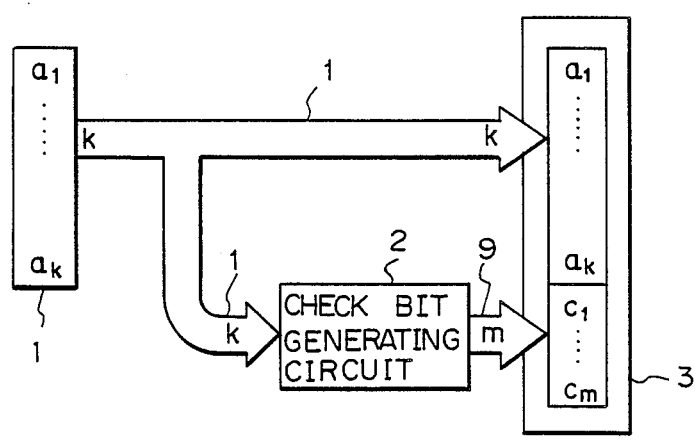
FIGS. 1A and 1B are block diagrams showing an embodiment of a data processing apparatus for a camera according to the present invention.

Before embodiments of the present invention are described, the principle of the present invention and a method of generating an error correcting code used in the present invention will first be described.

The error correcting code comprises an original code (information bit) and check bit added thereto, the check bit being made from an information bit by a predetermined rule. Various error correcting codes be made by the method of generating this check bit.

Generally, an m-bit check bit $[c_1 c_2 \ldots c_m]$, is added to k-bit information $[a_1 a_2 \ldots a_k]$, whereby an $l(=k+m)$-bit error correcting code $V[a_1 a_2 \ldots a_k c_1 c_2 \ldots c_m]$ is generated. The error correcting code V is generated so as to satisfy the following relation between it and a parity check matrix H (a matrix of size m×l, and hereinafter referred to as the H matrix):

$$H \cdot V^T = 0 \quad (1)$$

where $V^T$: transfer matrix of V $$H = \begin{pmatrix} h_{11} & h_{12} & \ldots & h_{1k} & 1 & 0 & \ldots & 0 \\ h_{21} & h_{22} & \ldots & h_{2k} & 0 & 1 & 0 & \ldots & 0 \\ \cdot & \cdot & & \cdot & & \cdot & & \cdot \\ \cdot & \cdot & & \cdot & & & \cdot & \cdot \\ \cdot & \cdot & & \cdot & & & & \cdot \\ h_{m1} & h_{m2} & \ldots & h_{mk} & 0 & & \ldots & & 1 \end{pmatrix} \quad (2)$$

Consequently, equation (1) above is:

$$\begin{pmatrix} h_{11} & h_{12} & \ldots & h_{1k} & 1 & 0 & \ldots & 0 \\ h_{21} & h_{22} & \ldots & h_{2k} & 0 & 1 & 0 & \ldots & 0 \\ \cdot & \cdot & & \cdot & & \cdot & & \cdot \\ \cdot & \cdot & & \cdot & & & \cdot & \cdot \\ \cdot & \cdot & & \cdot & & & & \cdot \\ h_{m1} & h_{m2} & \ldots & h_{mk} & 0 & & \ldots & & 1 \end{pmatrix} \begin{pmatrix} a_1 \\ a_2 \\ \cdot \\ \cdot \\ a_k \\ c_1 \\ \cdot \\ \cdot \\ c_m \end{pmatrix} = 0$$

Accordingly, $$0 = h_{11} \times a_1 \oplus h_{12} \times a_2 \oplus \ldots \oplus h_{1k} \times a_k \oplus 1 \times c_1$$
$$\oplus 0 \times c_2 \ldots \oplus 0 \times c_m$$

$$0 = h_{21} \times a_1 \oplus h_{22} \times a_2 \oplus \ldots \oplus h_{2k} \times a_k \oplus 0 \times c_1$$
$$\oplus 1 \times c_2 \ldots \oplus 0 \times c_m$$

$$\cdot$$
$$\cdot$$
$$\cdot$$

$$0 = h_{m1} \times a_1 \oplus h_{m2} \times a_2 \oplus \ldots \oplus h_{mk} \times a_k \oplus 0 \times c_1$$
$$\oplus 0 \times c_2 \oplus \ldots 1 \times c_m$$

where x represents logic product operation and $\oplus$ represents exclusive logic sum operation.

The above expression may be transformed into:

$$0 = h_{11} \times a_1 \oplus h_{12} \times a_2 \oplus \ldots \oplus h_{1k} \times a_k \oplus c_1$$
$$0 = h_{21} \times a_1 \oplus h_{22} \times a_2 \oplus \ldots \oplus h_{2k} \times a_k \oplus c_2$$
$$\cdot$$
$$\cdot$$
$$\cdot$$
$$0 = h_{m1} \times a_1 \oplus h_{m2} \times a_2 \oplus \ldots \oplus h_{mk} \times a_k \oplus c_m$$

and further into:

$$c_1 = h_{11} \times a_1 \oplus h_{12} \times a_2 \oplus \ldots \oplus h_{1k} \times a_k \quad (3)$$
$$c_2 = h_{21} \times a_1 \oplus h_{22} \times a_2 \oplus \ldots \oplus h_{2k} \times a_k$$
$$\cdot$$
$$\cdot$$
$$\cdot$$
$$c_m = h_{m1} \times a_1 \oplus h_{m2} \times a_2 \oplus \ldots \oplus h_{mk} \times a_k$$

Here, the H matrix is determined so that the row vectors thereof are primarily independent of each other, and in accordance with this H matrix, a 1-bit error correcting code $V[a_1 a_2 \ldots a_k c_1 c_2 \ldots c_m]$ is generated by check bits $c_1-c_m$ and information bits $a_1-a_k$ calculated from expression (3).

As an example, consider a case where the check bit m=3, i.e., 3-bit $[c_1, c_2, c_3]$ when the information bit is k=4, i.e., 4-bit $[1010]=[a_1, a_2, a_3, a_4]$ is to be found. In this case, H matrix is alternatively determined, and for example, it is assumed that the following is selected:

$$H = \begin{pmatrix} h_{11} & h_{12} & h_{13} & h_{14} & 100 \\ h_{21} & h_{22} & h_{23} & h_{24} & 010 \\ h_{31} & h_{32} & h_{33} & h_{34} & 001 \end{pmatrix} = \begin{pmatrix} 1011100 \\ 1101010 \\ 0111001 \end{pmatrix} \quad (4)$$

In this case, in accordance with expression (3), check bits $c_1$, $c_2$ and $c_3$ may be found as follows:

$$c_1 = 0, c_2 = 1, c_3 = 1$$

Since the information bit $[a_1 a_2 a_3 a_4] = [1010]$ as indicated above, the error correction code V is $$[a_1 a_2 a_3 a_4 c_1 c_2 c_3] = [1010011]. \quad (5)$$

The error correction code V obtained by such an operation is pre-stored into an EEPROM, and when an error occurs to the information bit read out on the basis of this code during the decoding, the correction thereof is made.

The decoding operation will now be described. The correcting code V is first read out from the EEPROM. Originally, $V = [1010011]$ indicated in expression (5) above is stored in the EEPROM and therefore, the read-out code V should be [1010011], but it is assumed here that for some reason or other, the read-out code V' is V≠V'. The V has its check bit determined so as to satisfy expression (1) and therefore, assuming that the read-out code V' remains V, from the relation with the H matrix of expression (4), $$H \text{ (expression (4))} \cdot V^T = 0,$$

whereas where V'≠V, it does not follow that $H \cdot V'^T \neq 0$, but it follows that $$H \cdot (V')^T = S^T (S^T \neq 0) \quad (6)$$

and syndrome S is derived.

That is, assuming that the error contained in V' is $E = [l_1 l_2 \ldots l_l]$, there is the relation that $$V' = V \oplus E \quad (7)$$

and if the read-out V' is substituted into equation (6), $$H \cdot V'^T = H \cdot (V \oplus E)^T = H \cdot V^T \oplus H \cdot E^T. \quad (7')$$

$H \cdot V^T$ is 0 because it satisfies equation (1).

Here, assuming that $V = V'$, $H \cdot E^T = 0$ because said error E is $E = [l_1, l_2, \ldots l_l](l_{1-l} = 0)$, equation (7') becomes $H \cdot V'^T = 0$, but where $V \neq V'$, equation (7') becomes $H \cdot E^T \oplus 0 = 1$, which means syndrome S, and thus, $$H \cdot E^T = S^T. \quad (8)$$

Consequently, by detecting this syndrome S, the error pattern E can be found and the error E contained in the read-out V' can be detected.

A description will now be provided on the basis of the foregoing example.

Let it be assumed that when the error correcting code $V = [1010011]$ found by equation (5) has been read out from the EEPROM, the data thereof contains 1-bit error and $V' = [1000011]$. On the basis of equation (6), $S^T$ may be found as follows:

$$\begin{pmatrix} 1011100 \\ 1101010 \\ 0111001 \end{pmatrix} \cdot \begin{pmatrix} 1 \\ 0 \\ 0 \\ 0 \\ 0 \\ 1 \\ 1 \end{pmatrix} = \begin{pmatrix} 1 \\ 0 \\ 1 \end{pmatrix} = S^T$$

and thus, $S = [101]$.

On the other hand, from equation (8), there is the relation that $H \cdot E^T = ST$ and therefore, $$\begin{pmatrix} 1011100 \\ 1101010 \\ 0111001 \end{pmatrix} \cdot \begin{pmatrix} l_1 \\ l_2 \\ \cdot \\ \cdot \\ \cdot \\ l_7 \end{pmatrix} = \begin{pmatrix} 1 \\ 0 \\ 1 \end{pmatrix}$$

and $l_1 \oplus l_3 \oplus l_4 \oplus l_5 = 1$ $l_1 \oplus l_2 \oplus l_4 \oplus l_6 = 0$ $l_2 \oplus l_3 \oplus l_4 \oplus l_7 = 1.$ Accordingly, only one of $l_1, l_3, l_4$ and $l_5$ is 1, only one of $l_2, l_3, l_4$ and $l_7$ is 1, and all of $l_1, l_2, l_4$ and $l_6$ are 0. To satisfy this condition, $l_3 = 1$ and $E = [0010000]$ is found. Also, since $V' = V \oplus E$, the correct V can be found. The position of 1 of $E = [0010000]$ indicates the erroneous bit of V' and therefore, if that bit is inverted relative to V', the correct V will be found, and V may also be found by this method. That is, in the above example, $V' = [100011]$ and $E = [0010000]$ and therefore, if V is found by inverting the third bit of V', $V = [1010011]$ and thus, the correct V can be found. As this inversion method, an operation which is $V = V' \oplus E$ may be effected. Further, as regards S found in the manner described above, the H matrix is set up so as to coincide with the row vector of the H matrix corresponding to the error position thereof and therefore, E can also be found by detecting the coincidence between S and the row vector of the H matrix.

That is, in the above example, $S = [101]$ and therefore, it can be immediately detected that equally with the third row of the H matrix, an error exists at the third bit of V'.

In the manner described above, the correct V can be restored from V' and the correct information bit data can be found from this V, and since the data stored in the EEPROM can be decoded into correct data even if it contains an error when read out, apparent reliability for the preservability of the data in the EEPROM is improved.

An embodiment of the present invention will now be described.

Figure 1B:
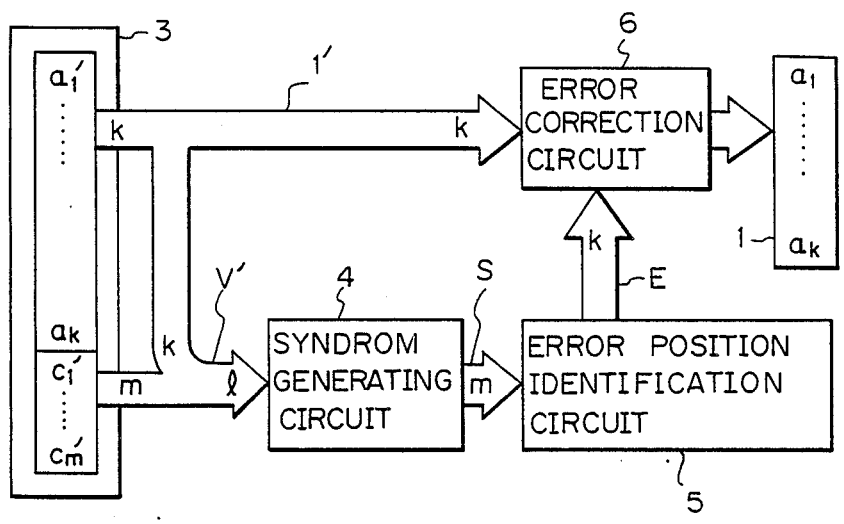

FIGS. 1A and 1B are block diagrams of an encoder and a decoder for realizing the error correction algorithm effected when data is stored into the memory device of the control apparatus according to the present invention. In the encoder shown in FIG. 1A, coding is effected in the following manner. The information bit 1 of k bits ($a_1$-$a_k$) is sent to a check bit generating circuit 2. The check bit generating circuit 2 effects the operation of expression (3) and generates a check bit 9 of m bits ($c_1$-$c_m$). The information bit 1 and the check bit 9 are both stored as a correcting code V in a memory device 3 (EEPROM). Decoding is effected by the decoder shown in FIG. 1B. The correcting code V is read out from the memory device 3. Assuming that the read-out codes ($a_1$-$a_k$, $c_1$-$c_m$) of $l(=k+m)$ bits are V', this V' is sent to a syndrome generating circuit 4. The syndrome generating circuit 4 effects the operation of equation (6), generates syndrome S and sends it to an error position identification circuit 5. The error position identification circuit 5 outputs an error pattern E representative of the error position found from the syndrome S by this operation. An error correcting circuit 6 corrects the error from the information bit 1' of V' containing the error pattern E and the error read out from the memory device, and outputs the corrected information bit 1.

Figure 2A:
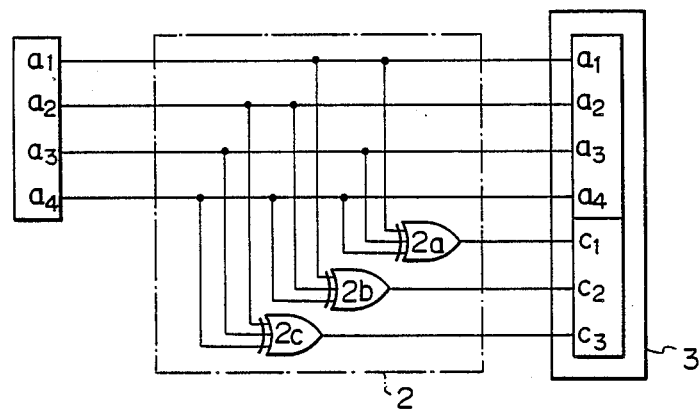
FIGS. 2A and 2B are circuit diagrams showing the construction of the data processing apparatus shown in FIGS. 1A and 1B.
Figure 2B:
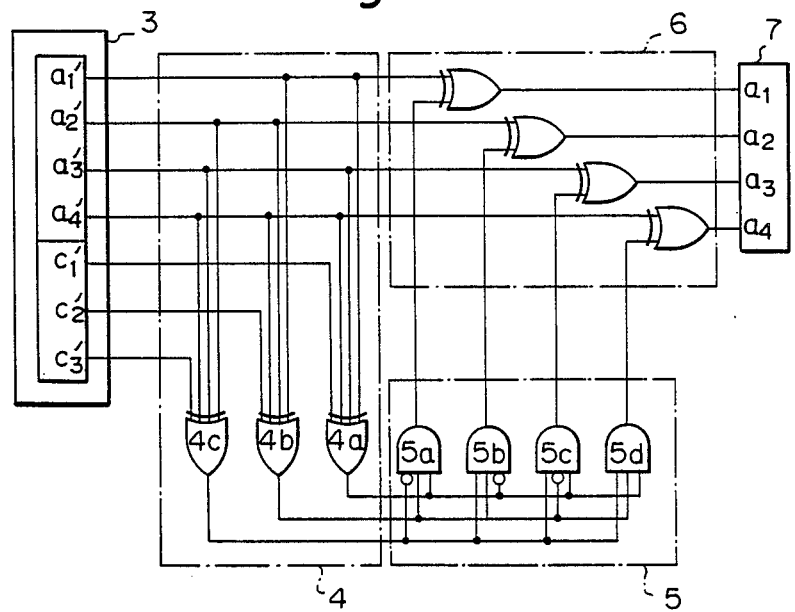

FIGS. 2A and 2B are connection diagrams showing the detailed circuit constructions of the encoder and decoder shown in FIG. 1. In FIG. 2, portions corresponding to those in FIG. 1 are given similar reference characters. FIG. 2 shows the case of information bit of 4 bits ($a_1$-$a_4$) and check bit of 3 bits ($c_1$-$c_3$), and it is to be understood that what is indicated in expression (4) is used as the H matrix. In the encoder of FIG. 2A, the check bit generating portion 2 effects the operation of expression (3) by exclusive logic sum circuits 2a, 2b and 2c, and as a result, outputs check bits $c_1$, $c_2$ and $c_3$ from the respective outputs thereof. That is, the H matrix of expression (4) is used and thus, expression (3) becomes $c_1 = a_1 \oplus a_3 \oplus a_4$ $c_2 = a_1 \oplus a_2 \oplus a_4$ $c_3 = a_2 \oplus a_3 \oplus a_4$ and $c_1$, $c_2$ and $c_3$ are found at exclusive OR gates 2a-2c, respectively, and check bits $c_1$, $c_2$ and $c_3$ are stored into the memory device 3. Also, information bits $a_1$-$a_4$ are stored intact into the memory device 3, whereby the error correcting code $V = [a_1\ a_2\ a_3\ a_4\ c_1\ c_2\ c_3]$ is stored into the memory device.

In the decoder of FIG. 2B, the syndrome generating circuit 4 comprises exclusive OR gates 4a, 4b and 4c.

These exclusive OR gates 4a, 4b and 4c effect the operation of equation (6) when the H matrix is expression (4), and forms the syndrome S as the output.

The error position identification circuit 5 is comprised of AND gates 5a-5c with inverter input and an AND gate 5d, and is designed to deliver 1 from the gate 5a when each exclusive OR gate 4a, 4b, 4c is 110, to deliver 1 from the gate 5b when each exclusive OR gate 4a, 4b, 4c is 011, to deliver 1 from the gate 5c when each exclusive OR gate 4a, 4b, 4c is 101, and to deliver 1 from the gate 5d when each exclusive OR gate 4a, 4b, 4c is 111. Thus, the row vector of the H matrix of expression (4) is coincident with the output pattern of the syndrome generating circuit 4, 1 is output from the gate 5a when the output pattern of the syndrome generating circuit 4 coincides with the first row of the row vector of the H matrix, 1 is output from the gate 5b when the output pattern coincides with the second row of the row vector, 1 is output from the gate 5c when the output pattern coincides with the third row of the row vector, and 1 is output from the gate 5d when the output pattern coincides with the fourth row of the row vector. Accordingly, when the output of the gate 5a-5d is viewed as the output of each bit, it shows the error pattern E based on the syndrome, and the error bit of the read-out code V' is identified.

Reference numeral 6 designates an error correction circuit comprising exclusive OR gates 6a-6d. This circuit 6 effects the processing V=V'⊕E, inverts the code of the bit indicated by the pattern E of the identification circuit 5, of the information bits of the read-out code V', finds the correct code V and corrects the error information bit signal to a correct signal.

Figures 3A, 3B:
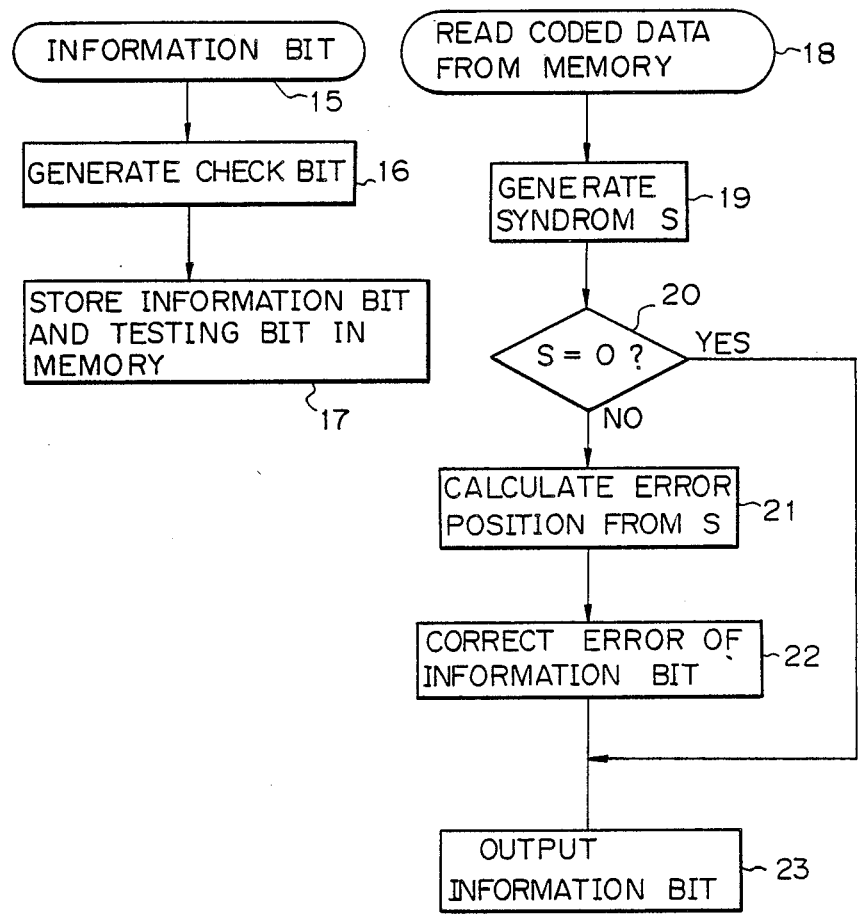
FIGS. 3A and 3B are flow charts showing the program flow when the data processing of the camera according to the present invention is effected by the program of a computer.

FIGS. 3A and 3B show the flow charts of the error correction algorithm in the present invention. FIG. 3A shows the process of coding. As seen there, at 16, for information bit 15 which is the original data before coded, the check bit for this data is generated by the operation of expression (3), and at 17, the information bit and check bit are stored as the code V into the memory device. FIG. 3B shows the process of decoding. At 18, the data stored in the memory device is taken out as V'. At 19, the operation of equation (6) is effected, syndrome S is generated from the data V', and whether the read-out data is correct, that is, whether S=0, is judged at 20. If an error is detected (S≠0), the operation of equation (8) is effected at 21, the error pattern E is found and the error position is detected, and at 22, the processing V'⊕E is effected to correct the error, the correct code V is found and the corrected information bit 23 is output. If no error is detected (S=0), 21 and 22 are skipped and outputting is effected intact. The program shown in FIGS. 3A and 3B can have its error, if any, corrected by being contained in a computer which will be described later.

The above-described data storing method is not restricted to an EEPROM, but is applicable independently of the type of the memory device. That is, it is also applicable both for the data for correcting the output of a photoelectric conversion sensor in an automatic focus detecting apparatus which is usually stored in a ROM or a PROM and for the film counter data usually stored in a RAM.

A will now be provided of a case where the data correction process according to the present invention is carried out by a correcting method different from the above-described correcting method.

An object which is to be subjected to the correction process will hereinafter be described with respect, for example, to the shading correction process of a sensor array used in a focus detecting apparatus. The shading correction will first be described.

Figure 4:
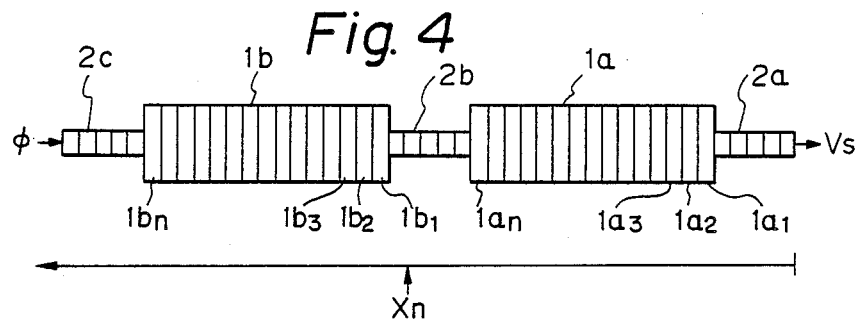
FIG. 4 shows the construction of sensors for forming a light-receiving element output when the data processing apparatus of the present invention is used to effect shading correction on the light-receiving element output.
Figure 5A:
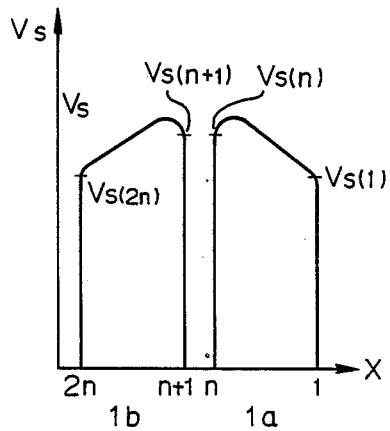
FIGS. 5A, 5B and 5C illustrate the shading correction.
Figure 5B:
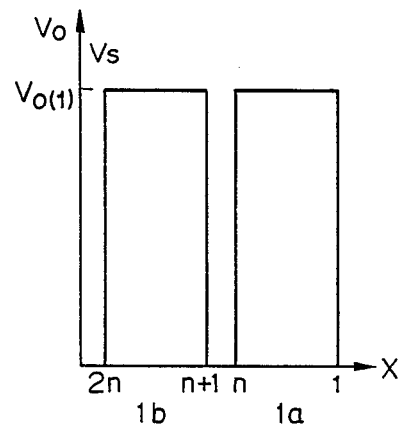
Figure 5C:
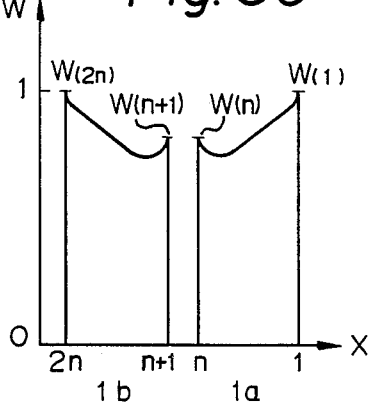

FIG. 4 shows a sensor array which requires the shading correction. This array comprises sensors 1a and 1b each comprising a number of rows of charge converting cells. The sensor signal $V_s$ of each cell is time-serially output from the 2a side by a driving pulse signal $\phi$ being input from the 2c side. The signal $V_s$ obtained from the sensors 1a and 1b is a signal representative of the quantity of light received by each cell, and originally, if a uniform quantity of light is applied to each cell, the output of each cell should be uniform as shown in FIG. 5B. However, even if a uniform quantity of light is actually applied to each cell, the output thereof varies in conformity with the position of the cell as shown in FIG. 5A, and a state in which so-called shading remains is provided. To convert such a signal in which shading remains to a uniform signal $V_o$ as shown in FIG. 5B, the sensor signal $V_s$ of FIG. 5A may be multiplied by a weight coefficient W as shown in FIG. 5C.

That is, expressing $V_s$, $V_o$ and W as $V_{s(x)}$, $V_{o(x)}$ and $W_{(x)}$ in a time-serial expression, $W_{(x)}$ may be determined so as to assume the following relation:

$$V_{o(x)} = V_{s(x)} \cdot W_{(x)} \quad (9)$$

$W_{(x)}$ can be found in advance because it is theoretically determined by the construction of the optical system, and this value is stored into the memory.

Describing in detail, if the signals $V_s$ at the cells $1a_1$–$1a_n$ of the sensor 1a of FIG. 4 and at the cells $1b_1$–$1b_n$ of the sensor 1b in the state in which a uniform quantity of light is applied to each cell are defined as $V_{s(1)}$–$V_{s(2n)}$, the weight coefficients $W_{(x)}$ (x is 1–2n) corresponding to the respective cells are set so as to satisfy the relations that $V_{o(1)} = V_{s(1)} \cdot W_{(1)}$, $V_{o(2)} = V_{s(2)} \cdot W_{(2)}$, ..., $V_{o(n)} = V_{s(n)} \cdot W_{(n)}$, ..., $V_{o(2n)} = V_{s(2n)} \cdot W_{(2n)}$ (where $V_{o(1)} = V_{o(2)} V_{o(3)} \ldots = V_{o(n)} = \ldots = V_{o(2n)}$, and each $W_{(x)}$ is stored in advance into a memory such as an EEPROM.

In this state, if the coefficients $W_{(x)}$ stored in the memory are time-serially read out in synchronism with the read-out of the signals $V_{s(x)}$ of the cells of the sensor array in the time-series and $V_{s(1)} \cdot W_{(1)}$, $V_{s(2)} \cdot W_{(2)}$, ... $V_{s(n)} \cdot W_{(n)}$, ... $V_{s(2n)} \cdot W_{(2n)}$ are effected, shading correction in each sensor cell will be done. A camera in which such shading correction is done is shown, for example, in Japanese Laid-Open Patent Application No. 101514/1985.

However, if $W_{(x)}$ of a value different from the stored data $W_{(x)}$ is read out when the memory reads out $W_{(x)}$, correct shading correction will become impossible.

In the present embodiment, if the stored data $W_{(x)}$ is of a value different from the data $W_{(x)}$ as stored when it has been read out, it is corrected by the processing of interpolation. The principle of the interpolation processing of the present embodiment will now be described.

Let it be assumed that by the above-described method, the coefficient data $W_{(x)}$ is stored in the memory. In the process wherein this stored coefficient data $W_{(x)}$ is read out in synchronism with the time-serial read-out of the signals $V_{s(x)}$ from the respective cells of the sensor, it is assumed that a coefficient $W_{(i)}$ read out synchronously from the memory relative to the signal $V_{s(i)}$ from the cell $1a_{(i)}$ exhibits a value different from the coefficient $W_{(i)}$ originally stored in the memory. In this case, assuming that the data $W_{(k)}$ and $W_{(j)}$ read out before that exhibit correct values, the coefficient $W_{(i)}$ can be found on the basis of these data $W_{(k)}$ and $W_{(j)}$.

Figure 6A:
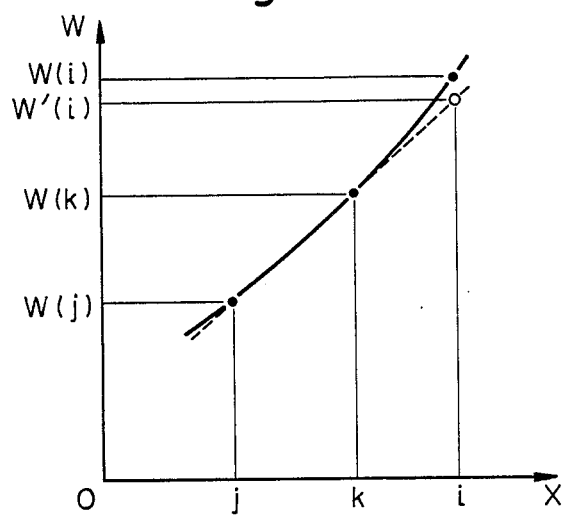
FIGS. 6A and 6B illustrate the principle of the data correction by the data processing apparatus of the present invention.

That is, as shown in FIG. 6A, the coefficient $W_{(i)}$ when the coefficients $W_{(k)}$ and $W_{(j)}$ have been read out as correct values is a coefficient originally indicative of a variation in a substantially linear function and therefore, it can be assumed from the mutual ratio relation that it is substantially indicative of the relation that $(k-i):(j-i)=(W_{(k)}-W_{(i)}):(W_{(j)}-W_{(i)})$. Accordingly, on the basis of this ratio relation, $W_{(i)}$ can be found as follows:

$$\frac{(k-i)W_{(j)} - (j-i)W_{(k)}}{k-j} = W_{(i)} \quad (10)$$

Figure 6B:
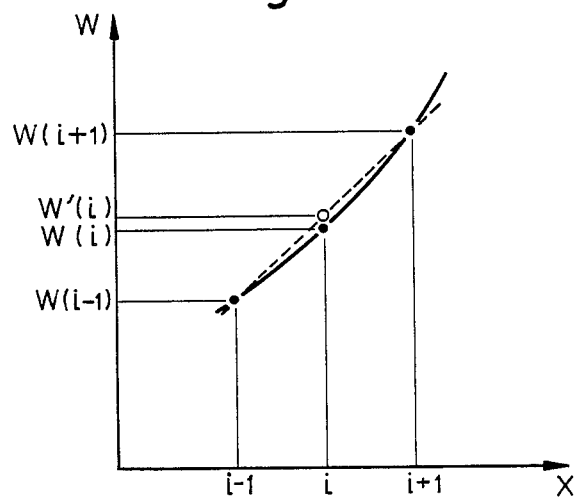

Assuming that this calculated coefficient is $W_{(i)'}$, even when there is an error in the read-out coefficient $W_{(i)}$ as shown in FIG. 6A, the coefficient $W_{(i)'}$ is found, whereby the shading correction is accomplished. The foregoing example is a case where $W_{(i)'}$ is found on the basis of the data $W_{(k)}$ and $W_{(j)}$ before the coefficient $W_{(i)}$ containing an error, but when the coefficients $W_{(i+1)}$ and $W_{(i-1)}$ before after $W_{(i)}$ are correct values, $W_{(i)'}$ can be found as $$\frac{W_{(i-1)} + W_{(i+1)}}{2} \quad (11)$$

and as shown in FIG. 6B, $W'_{(i)}$ can be obtained.

Figure 7:
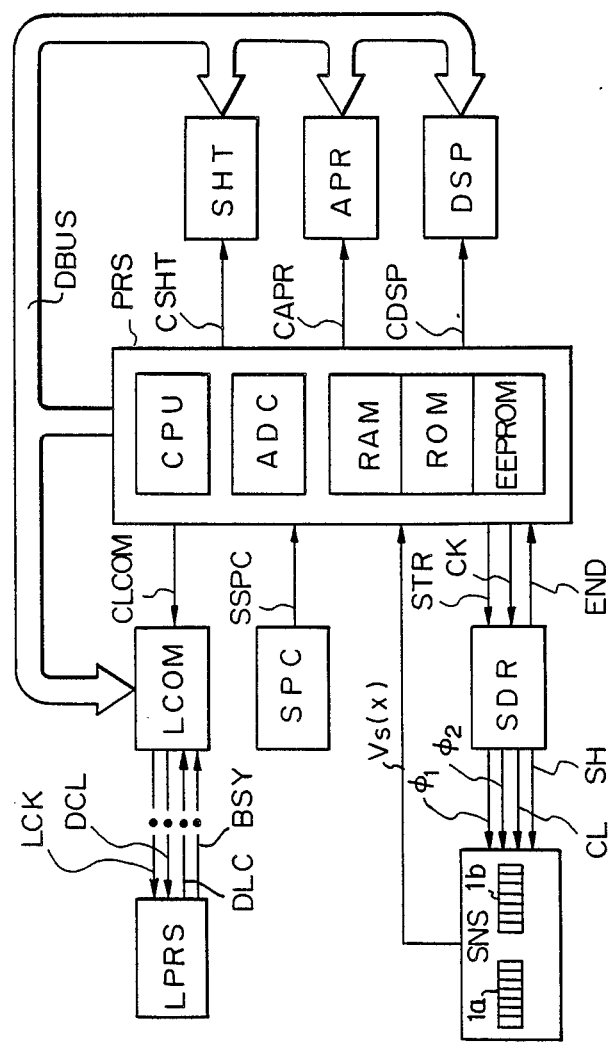
FIG. 7 is a circuit diagram showing an embodiment of a camera having the data processing apparatus according to the present invention.

FIG. 7 diagrammatically shows a conventional control apparatus for a camera to which the above-described correcting method is applied. In FIG. 7, PRS designates a 1-chip microcomputer having a central processing unit (CPU), an A/D converter (ADC), RAM, ROM, EEPROM and input and output ports. A program for the control of the camera including the coefficient $W_{(x)}$ of shading correction and parameters are stored in the ROM and the EEPROM. PRS is connected through a data bus DBUS to a shutter control circuit SHT, an aperture control circuit APR, a display circuit DSP, a lens communication circuit LCOM, etc., which receive data by control signals CSHT, CAPR, CDSP and CLCOM, respectively.

The shutter control circuit SHT controls the movement of a forward shutter curtain and a rearward shutter curtain, not shown, on the basis of the data provided by PRS. The aperture control circuit APR and the display circuit DSP respectively control an aperture mechanism and a display device, not shown. A photometering circuit SPC effects photometering, and the analog photometering output SSPC thereof is connected to an analog input terminal and is A/D - converted by the A/D converter ADC in the APR. This is used as photometering data for controlling the shutter control circuit SHT and the aperture control circuit APR. The lens communication circuit LCOM effects communications with a control circuit LPRS in a conversion lens by the use of a clock signal LCK, a data signal DCL, lens information DLC and a lens busy signal BSY. This circuit drives a motor, not shown, on the basis of the serially input data DCL and controls a focus adjusting lens. A sensor driving circuit SDR controls a sensor SNS having two sensor rows $1a$ and $1b$ by signals STR and CK from PRS, and outputs an end signal END to RPS. SNS is a photoelectric converting element such as a CCD line sensor. The sensor driving circuit SDR receives an accumulation start signal STR from PRS, sends a clear signal CL to SNS and clears the charges of the photoelectric converting element portion of SNS. By this process the photoelectric conversion and charge accumulation of the optical images formed on the sensor rows $1a$ and $1b$ are initiated. When a predetermined accumulation time elapses, the sensor driving circuit SDR sends a transfer signal SH to SNS and causes the charges of the photoelectric converting element portion to be transferred to the CCD portion. At the same time, it outputs the accumulation end signal END to PRS. When the end of accumulation is detected, PRS sends a CCD driving clock CK to the sensor driving circuit SDR, which produces CCD driving signals $\phi_1$ and $\phi_2$ from the CCD driving clock CK and sends them to the sensor SNS. The sensor SNS time-serially outputs the analog signal $V_{s(x)}$ by the signals $\phi_1$ and $\phi_2$, and this analog signal is A/D-converted in the A/D converter ADC within PRS in synchronism with the clock CK, and the converted image signal is stored into a predetermined address in the RAM.

Figure 8:
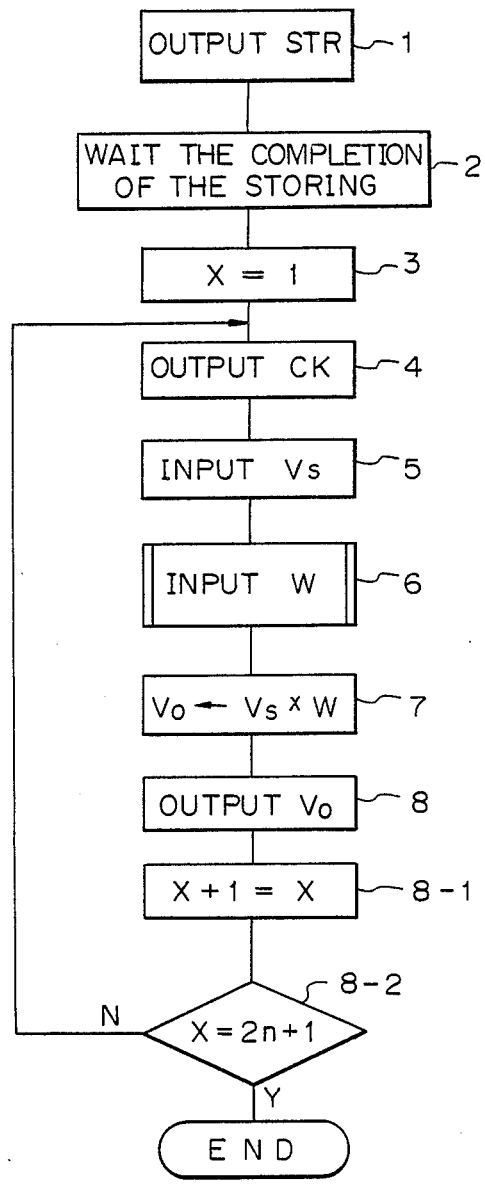
FIG. 8 and 9 are flow charts showing the program in accordance with which the data processing of the present invention is effected by the computer shown in FIG. 7.
Figure 9:
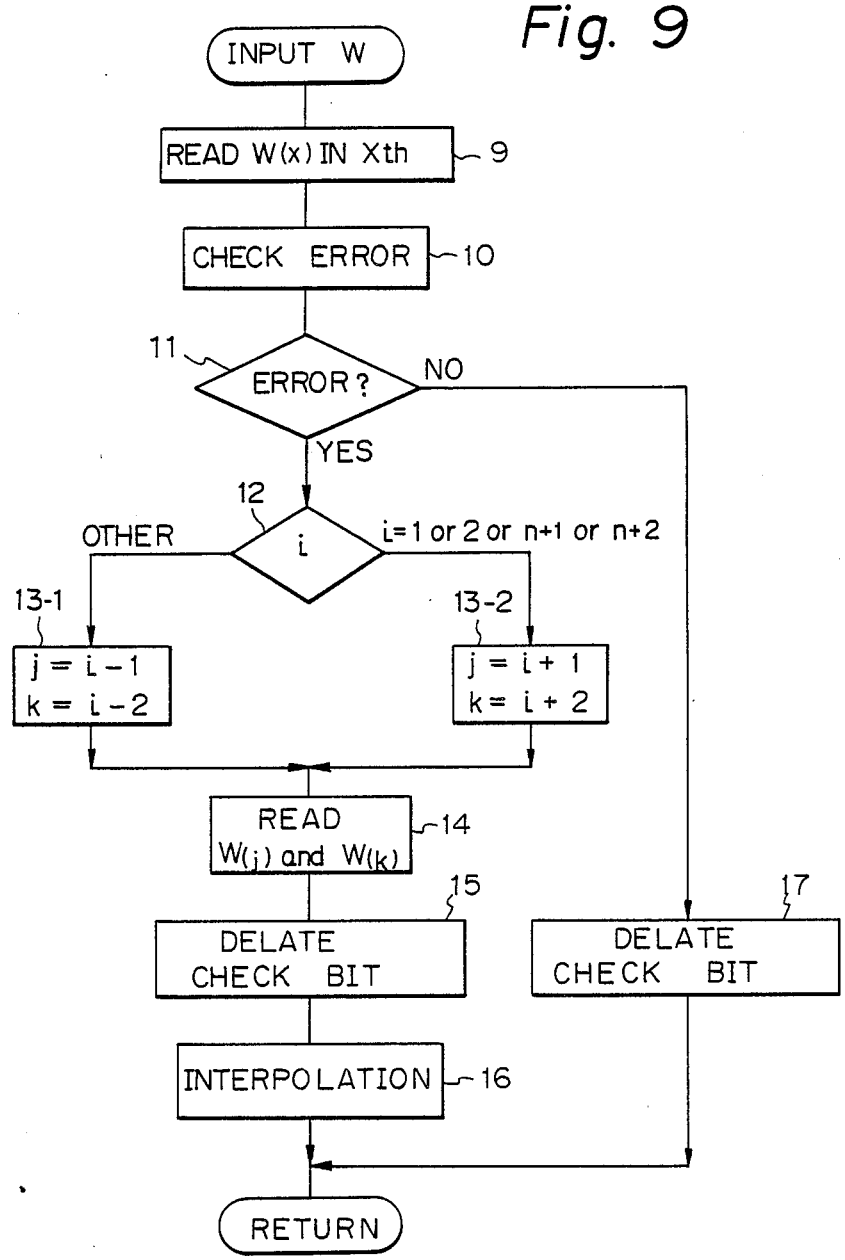

In the conventional control apparatus for a camera as described above, shading correction is effected in accordance with flow charts shown in FIGS. 8 and 9. These flows are programmed in the ROM and are controlled in accordance with this program.

The shading correction operation will hereinafter be described with reference to the flow charts of FIGS. 8 and 9. Let it be assumed that in the process in which the computer PRS is operating, the program has designated the program of FIG. 8 for shading correction. In this case, at step 1, the computer PRS outputs signal STR and causes the photoelectric conversion and charge storing of the sensor to be started.

Thereafter, at step 2, the completion of the storing is detected and the program shifts to step 3.

At step 3, the sensor element number data X is set to 1.

At step 4, the CCD portion driving clock CK is sent to the sensor driving circuit SDR and the output $V_{s(x)}$ from each sensor cell is delivered. Since X=1, an output $V_{s(1)}$ is delivered.

At step 5, the sensor output $V_{s(x)} = V_{s(1)}$ is A/D-converted.

At step 5, the flow of the subroutine of FIG. 9 is executed.

This flow first executes step 9. At step 9, $W_{(1)}$ of $W_{(x)}$ pre-stored in the memory EEPROM is read out. Next, at step 10, whether this coefficient $W_{(1)}$ is in the same state as that stored in the memory EEPROM, that is, whether it contains an error, is determined. The conventional parity check method is used for this error detection. As the parity check method, check bit (c) is added to information bits $(a_1 a_2 \ldots a_k)$ representative of the coefficient $W_{(x)}$ when the coefficient $W_{(x)}$ is stored into the memory EEPROM, $(a_1 a_2 \ldots a_k c)$ are formed as the coefficient $W_{(x)}$, and the coefficient $W_{(x)}$ with the check bit is pre-stored into the memory EEPROM. The check bit is such that the check bit c is "0" when the number of "1" in the information bits $(a_1 a_2 \ldots a_k)$ is an even number, that the check bit c is "1" when the number of "1" in the information bits $(a_1 a_2 \ldots a_k)$ is an odd number and that the number of "1" in the whole is always an even number. Consequently, if during the read-out of the coefficient $W_{(x)}$ stored in the memory EEPROM, there is a 1-bit error in the information bits ($a_1 a_2 \ldots a_k$) of the read-out data $W_{(x)}$, the number of "1" in the information bits is an odd number when the check bit is "0", and the number of "1" in the information bits is an even number when the check bit is "1". Consequently, on the basis of $W_{(x)} = (a_1 a_2 \ldots a_k c)$ read out at step 9, the aforementioned relation between said check bit and the number of "1" in the information bits is detected at step 10, and whether an error is contained in the read-out $W_{(x)}$ is determined. If at step 11, it is determined that no error is contained therein, the check bit c of $W_{(x)} = (a_1 a_2 \ldots a_k c)$ (since X=1, $W_{(x)} = W_{(1)}$) is deleted at step 17, to thereby bring about $W_{(x)} = W_{(1)} = (a_1 a_2 \ldots a_k)$, and the program shifts to the step 7 of FIG. 8.

At step 7, the operation of equation (9) is effected on the basis of $W_{(x)} = W_{(1)}$ read out in the described manner and $V_{s(1)}$ obtained at step 5, and shading correction of the data $V_{s(1)}$ is effected.

At step 8, the data $V_{s(1)}$ is input to the memory $M_1$ in the computer PRS.

At step 8-1, +1 is effected to X, and new X is found. Now X=1 and therefore, X=2.

At step 8-2, whether X has become X=2n+1 is detected, and when X≠2n+1, the program again shifts to step 4 and executes this step as described above. Thus, the outputs $V_{s(1)}, V_{s(2)}, \ldots, V_{s(2n)}$ from the sensor cells are successively read out and the coefficients $W_{(1)}, W_{(2)}, \ldots, W_{(2n)}$ corresponding to the cells are read out from the memory EEPROM, and said shading correction is effected for each output $V_{s(x)}$. The number of cells is 2n and therefore, when the shading correction of all the cells is completed, X=2n +1 is detected at step 8-2 and the shading correction program is terminated.

If at step 10, an error is detected when the data $W_{(x)}$ is read out from the memory EEPROM, the program shifts to step 12 through step 11. Assume that an error has been detected in the data of $W_{(i)}$. At step 12, whether i is 1 or 2 or n+1 or n+2 is determined, and if i is not i=1 or i=2 or i=n+1 or i=n+2, the program shifts to step 13-1. At step 13-1, processing j=i−1 and k=i−2 is effected, and the program shifts to step 14. At step 14, $W_{(j)}$ and $W_{(k)}$ of correct values already obtained by said processing are taken out, and at step 15, the check bit c contained in $W_{(i)}$ read out from the memory EEPROM is deleted, and the program shifts to step 16. At step 16, the operation of equation (10) is effected on the basis of $W_{(j)}$, $W_{(k)}$, j, k and i, and the corrected $W'_{(i)}$ is found and this $W'_{(i)}$ is used as $W_{(i)}$. Thus, even if there is an error in $W_{(i)}$, $W_{(i)} = W'_{(i)}$ corrected by the operation processing is found, and correction of the error is made and proper shading correction is effected for the output $V_{s(i)}$. If i detected at step 12 is 1 or 2 or n+1 or n+2, step 13−2 is executed instead of step 13−1.

At step 13−2, j=i+1 and k=i+2 are effected.

The reason why the program is thus divided into steps 13−2 depending on the value of i is that the number of the cells of the sensor is 1−n for 1b and n+1−2n for 2b and that when i=1 or 2, j and k to be found at step 13−1 are absent and likewise, when i=n +1 or n+2, j and k of the sensor 1b to be found at step 13−1 are absent, and in these cases, j and k with +1 and +2 effected to i are found, and the program shifts to step 14. In the processing of step 14 in this case, instead of the already processed $W_{(j)}$ and $W_{(k)}$, $W_{(j)}$ and $W_{(k)}$ are read out from the EEPROM and further, at step 15, all the check bits of $W_{(j)}$, $W_{(k)}$ and $W_{(i)}$ are deleted, and then at step 16, the operation of equation (10) is effected, whereby $W'_{(i)}$ is found.

A description will now be provided of an embodiment which adopts both of the correction processing of the first embodiment and the correction processing of the second embodiment.

Figure 10:
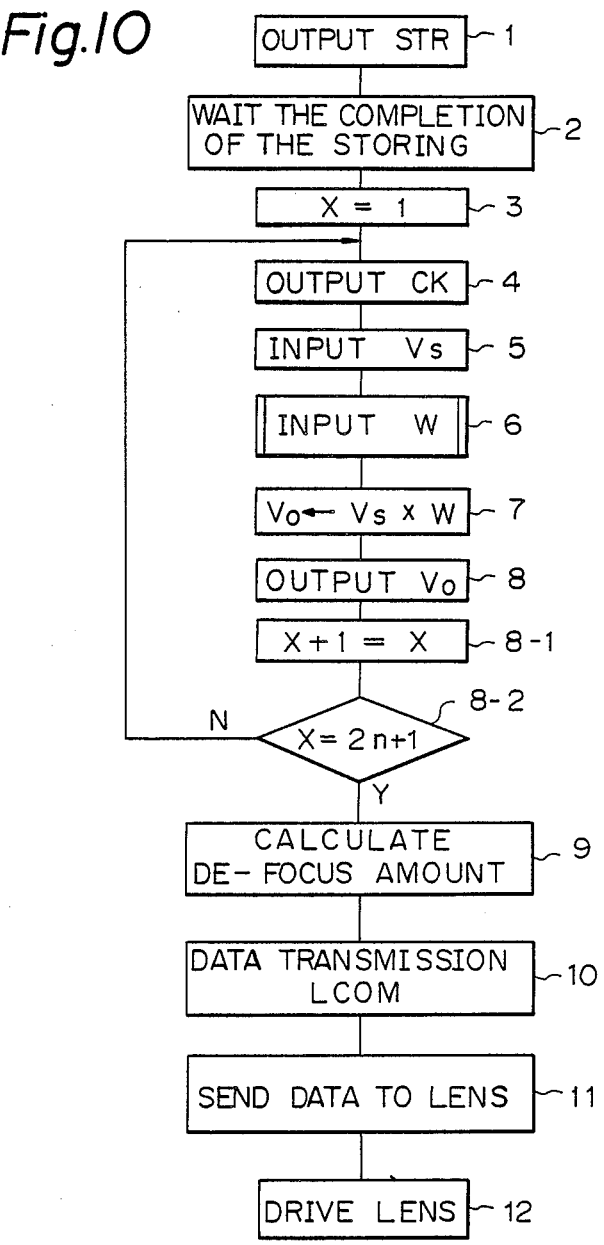
FIGS. 10, 11 and 12 are flow charts showing another example of the program in accordance with which the data processing of the present invention is effected by the computer shown in FIG. 7.
Figure 11:
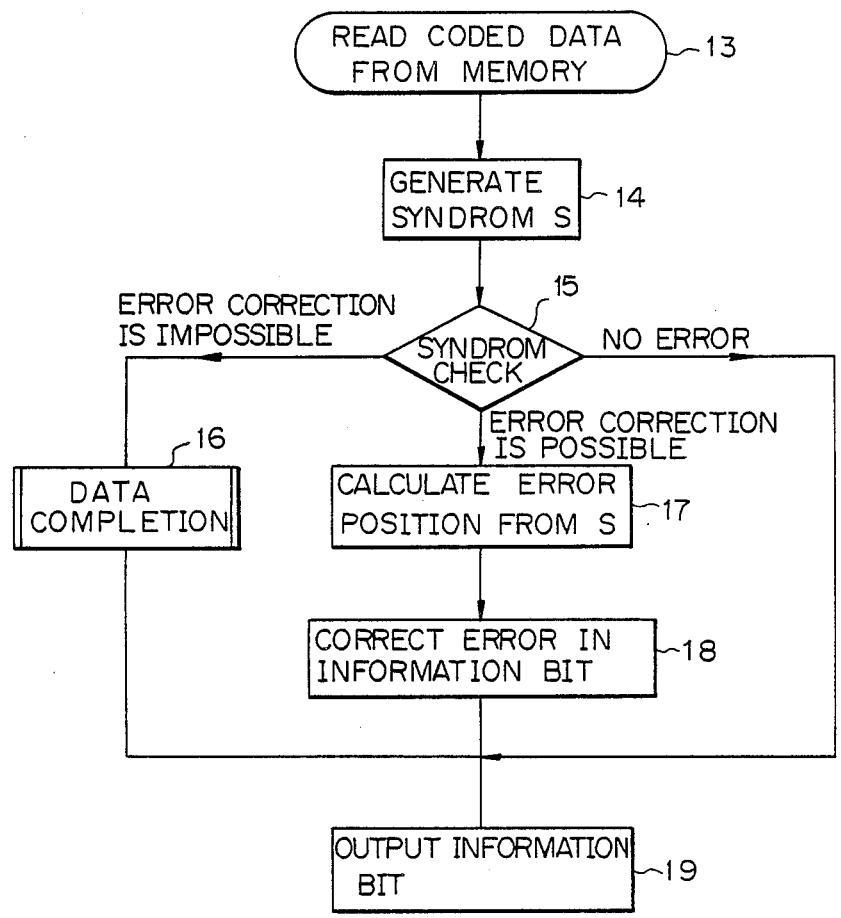
Figure 12:
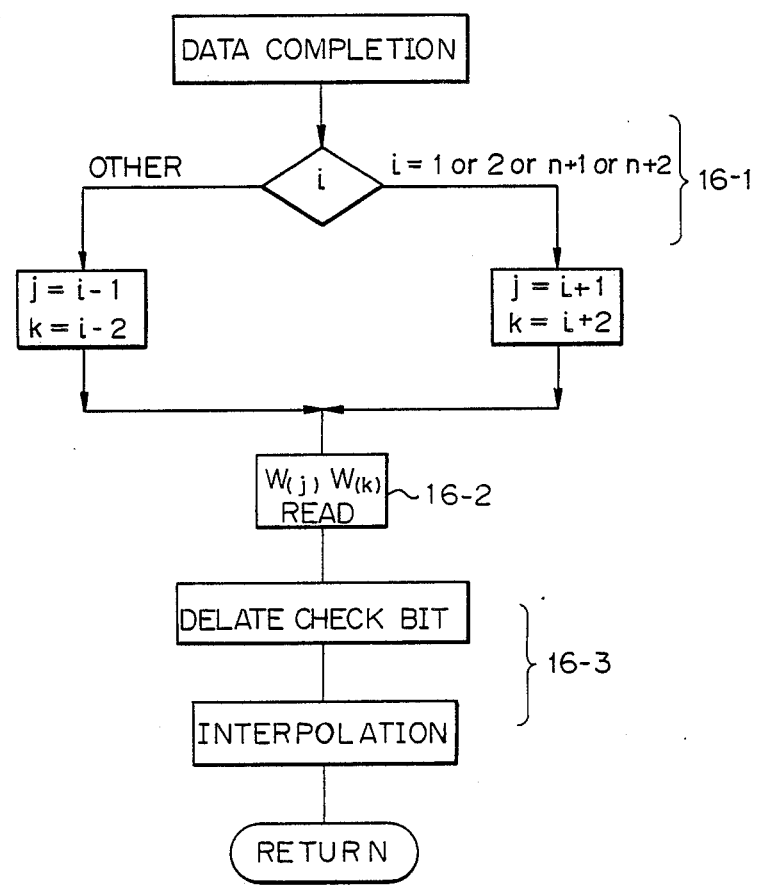

FIGS. 10–12 are flow charts showing the program flow used in the present embodiment, and this program flow is contained in the ROM of the computer PRS of FIG. 7. The circuits for realizing the present embodiment are the circuits shown in FIG. 7.

Steps 1 to 8−2 in the program of FIG. 10 are similar to the steps of FIG. 8, and when the program of FIG. 10 is executed, the following operations are executed:

Step 1: The computer PRS outputs signal STR and the sensors start photoelectric conversion and charge storing.

Step 2: The completion of the storing is detected.

Step 3: The sensor element number data X is rendered into 1.

Step 4: The CCD driving clock CK is sent to SDR.

Step 5: The sensor output $V_{s(x)} = V_{s(1)}$ is A/D-converted.

Step 6: The shading correction data is read out from the memory means EEPROM.

Step 7: The sensor output $V_{s(x)} = V_{s(1)}$ is corrected by the aforementioned expression (1).

Step 8: The result is stored into a predetermined address in the RAM.

Steps 8−1 and 8−2: Steps 4 to 8 are repeated twice and shading correction for all cells is effected.

Step 9: Focus detection calculation is effected on the basis of the shading-corrected data $V_{s(x)}$ to thereby detect the de-focus amount of the photo-taking lens.

Step 10: The de-focus data is sent to LCOM through CLCOM and data bus DBUS.

Step 11: LCOM sends the de-focus data to the focus adjusting lens in synchronism with signal DCL to clock LCK.

Step 12: LPRS, on the basis of the sent data, sends a signal for moving the lens to a motor, not shown, to thereby drive the lens.

The step 6 comprises the following steps as shown in FIG. 11.

When storing each said coefficient $W_{(x)}$ into the memory EEPROM, the data comprising information bit representative of the coefficient value $W_{(x)}$ and check bit is used as the error correcting code V, as in the first embodiment, and each $W_{(x)}$ is stored in the form of a correcting code V in EEPROM by the program processing shown in FIG. 3A. Also, this correcting code V is formed as an SEC-DED (single error correcting-double error detecting) code capable of making 1-bit error correction and detecting 2-bit error.

This SEC-DED code V is formed by the use of the H matrix as in the first embodiment. As the H matrix in this case, use is made of a matrix in which all row vectors differ from one another and the number of "1" in each row vector is an odd number. If the syndrome S is found by the use of this code V as in the first embodiment, detection of the error position of the information bits and 2-bit error will become possible. Instead of using this SEC-DED code, the same correcting code as that in the first embodiment may be formed.

The details of step 6 will now be described with reference to FIG. 11.

Step 13: The Xth data $W_{(x)}$ stored in the form of the error correcting code V in the EEPROM is read out.

Step 14: Error check is effected (syndrome S is generated). This processing is the same as the step 19 of FIG. 3B.

Step 15: If there is no error, the program branches off to step 19.

When there is a correctable error, the program branches off to step 17, and when interpolation is necessary, the program branches off to step 16. At this step 15, on the basis of the syndrome S at step 14, when S=0, it is determined that there is no error, and the program shifts to step 19, and when the number of "1" in the syndrome S is an odd number, it is determined that there is a 1-bit error, and the program shifts to step 17, and when the number of "1" in the syndrome S is an even number, it is determined that there is a 2-bit error, and the program shifts to step 16. Consequently, when there is no error in the read-out $W_{(x)}=V$, the $W_{(x)}=V$ stored in the EEPROM is output intact and at step 19, only the information bit of V is taken out and the processing of step 7 and subsequent steps is effected, whereby the shading correction is accomplished.

Also, when a 1-bit error has been detected, steps 17 and 18 are executed and the error contained in V is corrected. The processing of steps 17 and 18 are similar to the processing of the steps 21 and 22 of FIG. 3B and therefore need not be described. Consequently, when there is a 1-bit error in the $W_{(x)}=V$ read out from EEPROM, correction processing is effected and correct $W_{(x)}$ is output, and again in this case, correct shading correction is accomplished.

Also, when a 2-bit error has been detected, the subroutine of FIG. 12 is executed at step 16. The subroutine of FIG. 12 is similar to the steps 12-16 of FIG. 9 and therefore need not be described, but the correction processing of the above-mentioned error data is effected and again in this case, correct shading correction is accomplished.

When the program of FIG. 11 is corrected and it is determined at step 15 that the syndrome $S \neq 0$, the processing of step 17 may be effected, and when the position of the error cannot be detected by this processing, the program may be caused to shift to step 16, and when the position of the error can be detected, the program may be caused to shift to step 18.

In the present invention, as described above, even when the data stored in the memory device contains an error when reproduced, the original data is corrected or interpolated and therefore, correct data processing always becomes possible, and this is suitable for a case where use is made of a memory device such as an EEPROM which has a poor long-period data retaining characteristics.

The error correcting code is not limited to the code shown in the embodiments, but an interleave code, a fire code, etc. may also be used, and further, the secondary interpolation or the spline interpolation may also be used as the interpolation.

What we claim is:

1. A data processing device for a camera comprising:
   (a) memory means having stored therein a plurality of data necessary for effecting photographing, each data being substantially represented by a predetermined function or approximation and having a check bit;
   (b) read-out means for reading out data stored in said memory means;
   (c) an operation circuit for performing an operation for photographing on the basis of data read out by said read-out means;
   (d) a discrimination circuit for discriminating whether the read-out data is different from the stored data by detecting the check bit of the read-out data; and
   (e) a data reproducing circuit for replacing the read-out data with correction data when said discrimination circuit detects that the read-out data is different from the stored data, said data reproducing circuit calculating the correction data using a plurality of read-out data which are discriminated to be the same data as the stored data by said discrimination circuit.

2. A data processing device according to claim 1, wherein said discriminating circuit discriminates whether incorrect data has been read out by means of a parity check.

3. A data processing device according to claim 1, wherein said memory means has a plurality of memory portions each storing data respectively, the data stored in said memory portions including predetermined function or approximation coefficients which represent positions in said memory means, and wherein said reproducing circuit generates the correction data on the basis of data from a plurality of different memory portions, the position of the data stored in said memory portions, and the function or the approximation represented by the data.

4. A data processing device according to claim 1, wherein said memory means is an EEPROM.

5. A data processing device for a camera comprising:
   (a) memory means for storing a plurality of data required for photographing in respective predetermined plural address portions of said memory means, each of said data being represented by a predetermined function or approximation;
   (b) read-out means for reading out the data according to the address portions;
   (c) an operation circuit for performing an operation for photographing on the basis of the data read out by said read-out means;
   (d) a discrimination circuit for detecting the readout data and discriminating whether the read-out data is different from the stored data; and
   (e) a data reproducing circuit for calculating correction data on the basis of a plurality of data stored in the predetermined plural address portions when said discrimination circuit discriminates that the readout data is different from the stored data.

* * * * *

UNITED STATES PATENT AND TRADEMARK OFFICE
CERTIFICATE OF CORRECTION

PATENT NO. : 4,937,831

DATED : June 26, 1990

INVENTOR(S) : Aoyama, et al.

It is certified that error appears in the above-identified patent and that said Letters Patent is hereby corrected as shown below: ON TITLE PAGE:

AT [56]:

Change "Shreue" to --Shreve--.

FIGURE 1B:

Change "SYNDROM" to --SYNDROME--.

FIGURE 9:

Change "DELATE" to --DELETE-- (both occurrences).

FIGURE 11:

Change "SYNDROM" to --SYNDROME-- (both occurrences).

FIGURE 12:

Change "DELATE" to --DELETE--.

COLUMN 2:

Line 20, change "One" to --Still another--; and change "application" to --invention--.

UNITED STATES PATENT AND TRADEMARK OFFICE
CERTIFICATE OF CORRECTION

PATENT NO. : 4,937,831

DATED : June 26, 1990

INVENTOR(S) : Aoyama, et al.

It is certified that error appears in the above-identified patent and that said Letters Patent is hereby corrected as shown below:

COLUMN 3:

Line 4, change "codes" to --codes can--.

COLUMN 5:

Line 6, delete "said".

COLUMN 6:

Line 42, change "corrected" to --corrected correct--.

COLUMN 9:

Line 21, change "$W_{(i),,}$" to --$W_{(i)',,}$--.

Line 28, change "$W_{(i-1)}$before" to --$W_{(i-1)}$ before and--.

COLUMN 11:

Line 58, after "steps" insert --13-1 and--.

UNITED STATES PATENT AND TRADEMARK OFFICE
CERTIFICATE OF CORRECTION

PATENT NO. : 4,937,831     Page 3 of 3

DATED : June 26, 1990

INVENTOR(S) : Aoyama, et al.

It is certified that error appears in the above-identified patent and that said Letters Patent is hereby corrected as shown below:

COLUMN 14:

Line 51, change "readout" to --read-out--.

Line 58, change "readout" to --read-out--.

Signed and Sealed this

Fourth Day of August, 1992

Attest:

DOUGLAS B. COMER

Attesting Officer

Acting Commissioner of Patents and Trademarks